United States Patent
Toledo et al.

(10) Patent No.: US 8,169,341 B2
(45) Date of Patent: *May 1, 2012

(54) VEHICLE PARK ASSIST SYSTEM AND METHOD FOR PARKING A VEHICLE USING SUCH SYSTEM

(75) Inventors: Salvador Toledo, Ypsilanti, MI (US); Dirk Gunia, Pulheim (DE); Kay C. Müller, Köln (DE); Torsten Wey, Moers (DE); Nate Rolfes, Livonia, MI (US); Janet Meise, Köln (DE); Marcus Kalabis, Krefeld (DE)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

This patent is subject to a terminal disclaimer.

(21) Appl. No.: 12/574,840

(22) Filed: Oct. 7, 2009

(65) Prior Publication Data

US 2011/0080305 A1    Apr. 7, 2011

(51) Int. Cl.
*B60Q 1/48* (2006.01)
(52) U.S. Cl. ...................................... 340/932.2; 701/41
(58) Field of Classification Search ............... 340/932.2; 701/36, 41–44
See application file for complete search history.

(56) References Cited

U.S. PATENT DOCUMENTS

| | | | |
|---|---|---|---|
| 5,742,141 A * | 4/1998 | Czekaj | 701/41 |
| 6,097,314 A * | 8/2000 | Desens et al. | 340/932.2 |
| 6,919,822 B2 | 7/2005 | Tanaka et al. | |
| 6,919,917 B1 | 7/2005 | Janssen | |
| 6,948,729 B2 | 9/2005 | Zalila et al. | |
| 7,117,073 B2 | 10/2006 | Endo et al. | |
| 7,526,368 B2 | 4/2009 | Endo et al. | |
| 2004/0249564 A1 * | 12/2004 | Iwakiri et al. | 701/200 |
| 2008/0033647 A1 | 2/2008 | Milark et al. | |
| 2008/0077294 A1 * | 3/2008 | Danz et al. | 701/41 |
| 2009/0167564 A1 * | 7/2009 | Long-Tai et al. | 340/932.2 |
| 2009/0312912 A1 * | 12/2009 | Braegas | 701/42 |
| 2010/0271236 A1 * | 10/2010 | Moshchuk et al. | 340/932.2 |

* cited by examiner

*Primary Examiner* — Thomas Mullen
(74) *Attorney, Agent, or Firm* — Frank MacKenzie; MacMillan, Sobanski & Todd, LLC

(57) ABSTRACT

A park assist system for parking a vehicle in a target parking space includes a sensing system. The sensing system determines whether there is a sufficient slot length in a target parking space too small to complete a parking maneuver in a single maneuver, but large enough to complete a parking maneuver in more than one maneuver. During each of the more than one parking maneuvers, the driver is prompted to execute a calculated steering trajectory.

2 Claims, 2 Drawing Sheets

VEHICLE PARK ASSIST SYSTEM AND METHOD FOR PARKING A VEHICLE USING SUCH SYSTEM

BACKGROUND

This invention relates in general to vehicle park assist systems and in particular to an improved park assist system and method for parking of such a vehicle.

Vehicle park assist systems are used to identify a feasible parking space, e.g., usually a parallel space, a rear perpendicular space, or a garage parking space, and then take over the steering of the vehicle to maneuver the vehicle into the identified space hands free. During operation, the driver still shifts the transmission and operates the gas and brake pedals. Thus, while the steering is done automatically, the driver is still responsible for safe parking of the vehicle.

One known vehicle park assist system is disclosed in U.S. Pat. No. 6,948,729 to Zalila et al. In U.S. Pat. No. 6,948,729, sensors 36 sense front obstacles 4, back obstacles 16, and an edge 5 of the possible parking space 2. Sensed data is processed and an output is provided which assists the driver in parking the vehicle.

SUMMARY

The present application describes various embodiments of a park assist system. One embodiment of the park assist system for parking a vehicle in a target parking space includes a sensing system which determines whether there is a sufficient slot length in a target parking space too small to complete a parking maneuver in a single maneuver, but large enough to complete a parking maneuver in more than one maneuver. During the execution of more than one parking maneuver, the driver is prompted to execute a calculated steering trajectory during each of the more than one parking maneuvers.

According to another embodiment, a method for parking a vehicle in a target parking space includes a vehicle having a sensing system and a park assist system operatively connected thereto. Neighboring objects are scanned using a sensor to determine if a target parking space is available for parking the vehicle. The neighboring objects include at least one object either in front of or behind the target parking space, and the sensor provides an input signal to the park assist system. The park assist system is used to determine whether there is a sufficient slot length in a target parking space too small to complete a parking maneuver in a single maneuver, but large enough to complete a parking maneuver in more than one maneuver. If there is sufficient slot length in which to park the vehicle, then the driver is prompted to execute each of the more than one parking maneuver required to park the vehicle in the target parking space.

Other advantages of the park assist system will become apparent to those skilled in the art from the following detailed description, when read in light of the accompanying drawings.

BRIEF DESCRIPTION OF THE DRAWINGS

FIG. 1A is a schematic diagram of a portion of the park assist system illustrated in FIG. 1, showing the associated vehicle used therewith.

DETAILED DESCRIPTION

Figure 1:
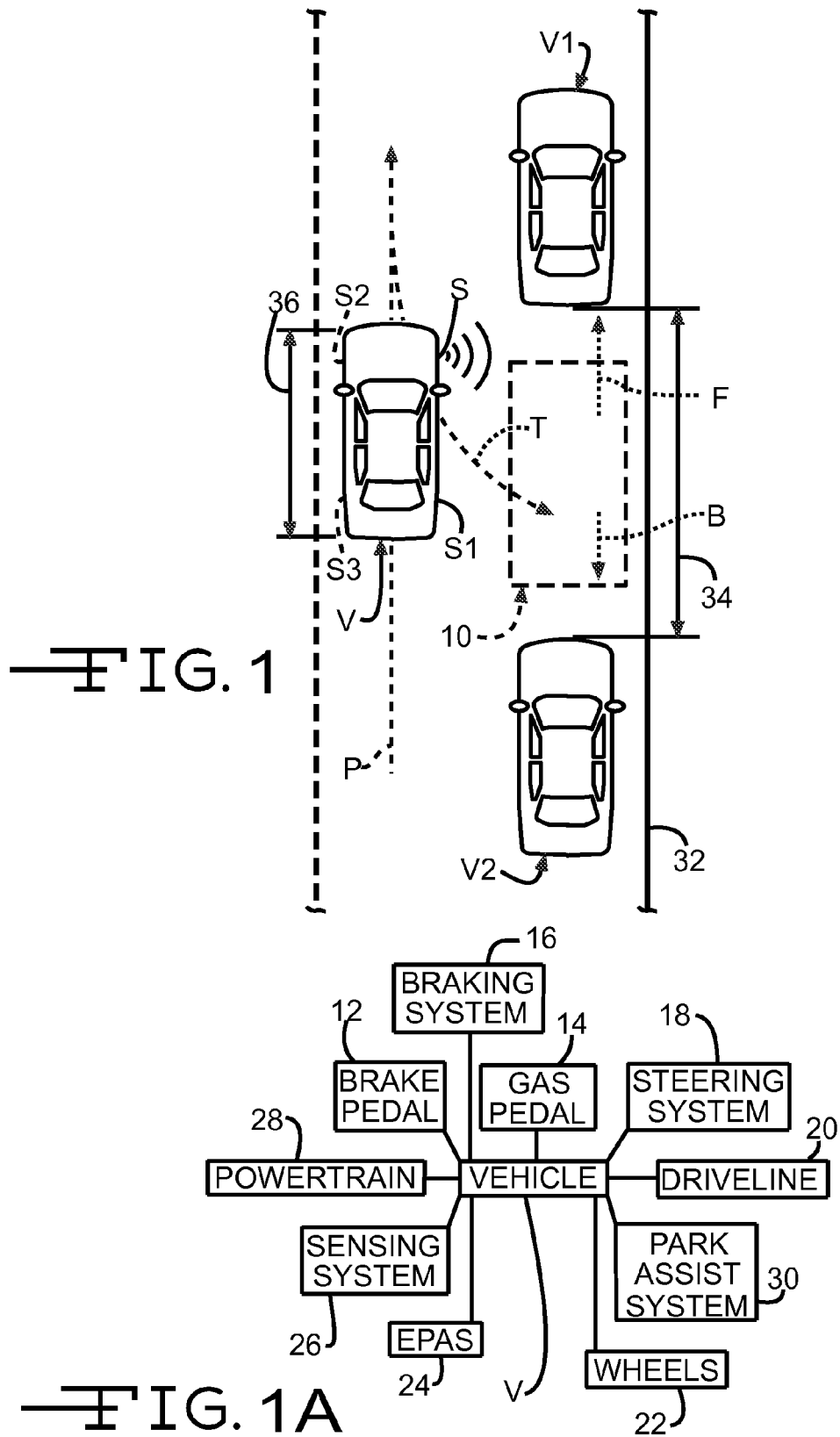
FIG. 1 is a schematic diagram of a first embodiment of a path to a target parking space using a park assist system according to the present invention.

Referring now to FIG. 1, there is illustrated a schematic diagram of a first embodiment of a path P for parking of a vehicle V to a target parking space or space 10 between two parked vehicles V1 and V2, using a park assist system, which will be described in detail below, according to the present invention. In the illustrated embodiment, the vehicle V, schematically shown in FIG. 1A, includes at least the following components or systems: a brake pedal 12, a gas pedal 14, a braking system 16, a steering system 18, a driveline system 20, wheels 22, an electric power assisted steering (EPAS) system 24 which is part of the steering system 18, a sensing system 26, a powertrain system 28, and a park assist system 30. Alternatively, an electro-hydraulic power assisted steering system may be used in lieu of EPAS, and radar, lidar, lasers, or thermal sensors may be used in lieu of the ultrasonic sensors. The park assist system 30 is also shown schematically in FIG. 1. However, it must be understood that the vehicle V to be parked may include any other suitable components or systems and that only those components or systems which are necessary for describing and explaining the function and operation of the present invention are illustrated herein.

In the illustrated embodiment, the sensing system 26 is operatively connected to the park assist system 30 to provide input signal(s) thereto and preferably includes ultrasonic sensors, GPS and/or odometric sensors, and an absolute steering wheel angle sensor. Alternatively, the park assist system 30 may include a relative steering wheel angle sensor in lieu of an absolute steering wheel angle sensor. The ultrasonic sensors may be located on a side(s) of a front and/or rear bumpers of the vehicle V. In the illustrated embodiment of FIG. 1, an ultrasonic sensor, indicated generally at S is illustrated schematically. The sensor S is shown as being located on a front passenger or right side bumper of the vehicle V.

Alternatively, the number and/or the location of the ultrasonic sensors may be other than illustrated if so desired. For example, one or more ultrasonic sensors may be located on the front driver or left side bumper of the vehicle V, as shown at S2. One or more ultrasonic sensors may also be located on one or both of the rear bumpers of the vehicle (as shown as S1 and S3 in FIG. 1), or in any suitable combinations of or desired locations thereof on the vehicle V.

In the illustrated embodiment, the odometric sensors may be located on one or more of the wheels 22 of the vehicle V and/or in the driveline system 20 of the vehicle. The steering wheel angle sensor is located on the steering system 18 of the vehicle and preferably is located on a steering wheel of the steering system 18. Alternatively, the construction and/or the components of the sensing system 26 of the vehicle V may be other than illustrated and described if so desired.

In the illustrated embodiment, the vehicle V is parked into the target parking space 10 using the park assist system 30 of the present invention. To accomplish this, at least one of the ultrasonic sensors S, S1 is used in conjunction with the odometric sensors and the steering wheel angle sensor to scan neighboring objects and their location relative to the position of the vehicle V as a driver of the vehicle drives by the objects. In the illustrated embodiment of FIG. 1, the neighboring objects are illustrated as being the two parked vehicles V1 and V2 and an object 32, such as for example, a curb or a wall. However, one or more of the neighboring objects may be other kinds or types than that which are illustrated and described. It will be understood that the park assist system 30 of the present invention may successfully identify a target parking space 10 relative to only one object or vehicle, such as either the vehicle V1 or the vehicle V2, that is present and sensed.

The information from the sensors is processed by a computer of the park assist system 30 to determine if a valid steering trajectory T can be performed to park the vehicle V into the target parking space 10. The calculation by the computer of the park assist system 30 includes a determination of a slot length 34 depending upon a length 36 of the vehicle V.

The movement of the vehicle along the steering trajectory T may be performed in one parking maneuver. As used herein, one parking maneuver is defined as (1) moving the vehicle rearwardly from a stop into the target parking space (to the right rear when viewing FIG. 1), (2) stopping the vehicle briefly within the target parking space, (3) moving the vehicle forward within the target parking space, and (4) then stopping and thus parking the vehicle. A subsequent rearward and/or forward movement of the vehicle defines an additional parking maneuver.

Figure 2:
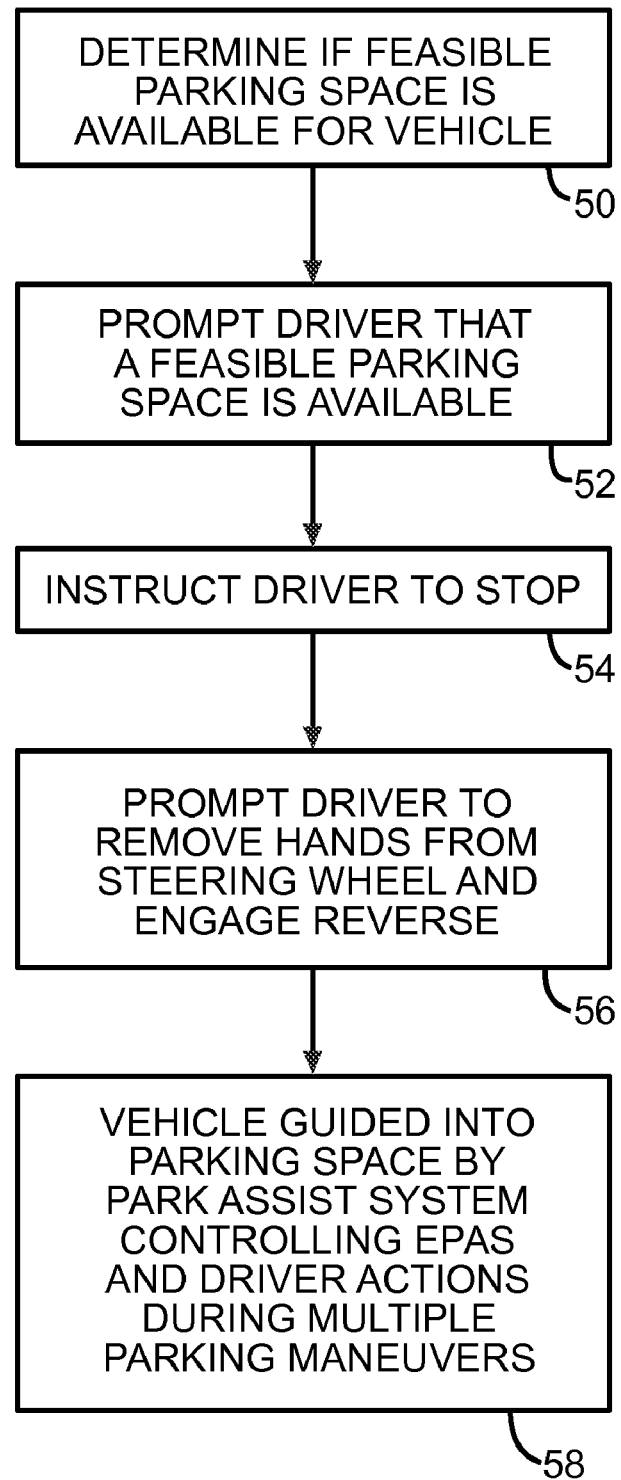
FIG. 2 is a flow chart of an embodiment of a method for parking a vehicle using the park assist system of the present invention.

Referring now to FIG. 2, there is illustrated a flow chart of an embodiment of a method for parking a vehicle using the park assist system 30 of the present invention. As shown in FIG. 2, the method of the present invention includes a first step 50 in which the park assist system 30 determines if there is a feasible target parking space 10 available for parking of the vehicle V. To accomplish this, the park assist system 30 uses the sensor S of the sensing system 26. As discussed above, the sensor S determines whether there is a sufficient slot length 34 in which to park the vehicle V.

The park assist system 30 may determine in step 50 that the target parking space 10 is feasible, but too small to allow the vehicle to be parked in one parking maneuver; i.e., that the vehicle V will require more than one parking maneuver to be executed in order for the vehicle V to become successfully parked. Once it is determined that such a smaller but feasible target parking space 10 has been identified by the park assist system 30, the park assist system 30 in step 52 prompts the driver via a visual and/or audible interface that a feasible target parking space 10 is available. The park assist system 30 then recommends the parking space 10.

One example of a visual interface is a text message displayed in a message center in the vehicle instrument panel. Alternatively, the visual interface may be a graphic image, icon, or other non-text representation. It will be understood that such a visual interface may be located at any other desired location in the vehicle, such as an overhead console.

Next, in step 54, the driver is instructed by the park assist system 30, either visually and/or audibly, to stop in order to accept the system assistance to park Once the driver has stopped the park assist system 30 in step 56 will prompt the driver to remove his or her hands from a steering wheel of the steering system 18 and engage or shift the transmission of the powertrain system 28 into reverse gear. Once the driver has removed his or her hands from the steering wheel and engaged reverse gear, the park assist system 30 in step 58 will take over the steering wheel movement and control the EPAS system 24 to execute the calculated steering trajectory T based on the relative vehicle position to the neighboring objects, i.e., in FIG. 1 the vehicles V1 and V2 and the object 32. The park assist system 30 will prompt the driver when to stop, drive backward, and pull forward to park the vehicle V in the target parking space 10 in one parking maneuver.

In step 54 as described above, after the driver accepts the system assistance to park the vehicle V, the driver is instructed by the park assist system 30, either visually and/or audibly, to stop, remove his or her hands from a steering wheel, and engage or shift into reverse gear. Once the driver has removed his or her hands from the steering wheel and engaged reverse gear, the park assist system 30 in step 58 will take over the steering wheel movement and control the EPAS system 24 to execute the calculated steering trajectory T based on the relative vehicle position to the neighboring objects, i.e., in FIG. 1 the vehicles V1 and V2 and the object 32. The park assist system 30 will prompt the driver when to stop, drive backward along a calculated steering trajectory as shown by the arrow B, and pull forward along a calculated steering trajectory as shown by the arrow F. The park assist system 30 will prompt the driver, either visually and/or audibly, to drive backward B and drive forward F as many times as required to park the vehicle V in the target parking space 10.

Additionally, the target parking space 10 has been described as being on the right side of the vehicle V. Alternatively, the park assist system 30 may be used to identify a target parking space on the left side of the vehicle V.

One advantage of the embodiments of the present invention is that the park assist system 30 and method of the operation thereof is capable of supporting multiple auto-steer parallel parking maneuvers with visual and/or audible driver prompts or feedback. As a result of this, the park assist system 30 can recommend a target parking space 10 that otherwise may have insufficient slot length in which to park the vehicle, but in which a vehicle may be parked using multiple auto-steer maneuvers guided by visual and/or audible driver prompts or feedback. As an additional result of this, a larger number of parallel parking spaces, which otherwise may not be identified as being feasible because the vehicle cannot be parked in a single parking maneuver, will be available in which to park using the park assist system of this invention.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A method for parallel parking a vehicle in a target parking space, the target parking space being a parallel parking space between a first object in front of the target parking space and a second object behind the target parking space wherein the slot length of the target parking space is too small to complete a parallel parking maneuver in one maneuver but large enough to complete the parallel parking maneuver in multiple maneuvers, the vehicle having a sensing system and a park assist system, the method comprising the steps of:

(a) scanning objects near the vehicle using the sensing system to determine when the target parking space having the slot length too small to complete the parallel parking maneuver in the one maneuver but large enough to complete the parallel parking maneuver in the multiple maneuvers is detected, the one maneuver being moving the vehicle rearward from a stop into the target parking space, stopping the vehicle, moving the vehicle forward within the target parking space and stopping in a vehicle parked position, the multiple maneuvers including the rearward and forward movements of the one maneuver plus at least one additional rearward movement of the vehicle before arriving in the vehicle parked position;

(b) providing an input signal from the sensing system to the park assist system when the target parking space is detected;

(c) after step (b), automatically steering the vehicle while backing the vehicle partially into the target parking space;
(d) after step (c), automatically steering the vehicle while moving the vehicle forward into the target parking space; and
(e) after step (d), automatically steering the vehicle while backing the vehicle in the target parking space and stopping the vehicle in the target parking space to complete arrival in the vehicle parked position.

2. A method for parallel parking a vehicle in a target parking space, the target parking space being a parallel parking space between a first object in front of the target parking space and a second object behind the target parking space wherein the slot length of the target parking space is too small to complete a parallel parking maneuver in one maneuver but large enough to complete the parallel parking maneuver in multiple maneuvers, the vehicle having a sensing system and a park assist system, the method comprising the steps of:

(a) scanning objects near the vehicle using the sensing system to determine when the target parking space having the slot length too small to complete the parallel parking maneuver in the one maneuver but large enough to complete the parallel parking maneuver in the multiple maneuvers is detected, the one maneuver being moving the vehicle rearward from a stop into the target parking space, stopping the vehicle, moving the vehicle forward within the target parking space and stopping in a vehicle parked position, the multiple maneuvers including the rearward and forward movements of the one maneuver plus at least one additional rearward and forward movement of the vehicle before arriving in the vehicle parked position;
(b) providing an input signal from the sensing system to the park assist system when the target parking space is detected;
(c) after step (b), automatically steering the vehicle while backing the vehicle partially into the target parking space;
(d) after step (c), automatically steering the vehicle while moving the vehicle forward into the target parking space;
(e) after step (d), automatically steering the vehicle while backing the vehicle in the target parking space; and
(f) after step (e), automatically steering the vehicle while moving the vehicle forward in the target parking space and stopping the vehicle in the target parking space to complete arrival in the vehicle parked position.

\* \* \* \* \*